2,796,428
Patented June 18, 1957

2,796,428

PREPARATION OF CARVONE

Albert B. Booth and Eugene A. Klein, Jacksonville, Fla., assignors to The Glidden Company, Cleveland, Ohio, a corporation of Ohio No Drawing. Application July 24, 1953,
Serial No. 370,232

10 Claims. (Cl. 260—489)

The present invention relates to the preparation of carvone.

Carvone is a major constituent of such essential oils as spearmint, caraway and dill, and as such has considerable economic importance. It is also an important constituent of a number of less familiar essential oils. The carvoniferous oils are costly and are subject to wide variation in price. Further, some of them are obtained from foreign sources which fact renders their supply rather uncertain.

It is known that α-pinene, a readily available domestic raw material, may be oxidized to sobrerol under certain conditions, and that sobrerol may be oxidized by chromic acid to 8-hydroxy carvotanacetone.

It is also known that 8-hydroxy carvotanacetone can be converted to carvone, but the yields of carvone from 8-hydroxy carvotanacetone by any known method are poor, due principally to the fact that 8-hydroxy carvotanacetone readily passes to carvacrol. Carvacrol is then the main product by any known dehydration. It is even reported to be the main product when 8-hydroxy carvotanacetone is dehydrated by heating it alone in vacuo.

It is accordingly an object of the present invention to provide an improved process for preparing carvone.

A further object is to provide an improved process for preparing carvone from 8-hydroxy-carvotanacetone.

Another object is to provide intermediates useful for the accomplishment of the foregoing objects.

An additional object is to prepare optically active carvone.

Other objects will be apparent to those skilled in the art from the following description of the invention.

It has been found that the foregoing objects can be accomplished by pyrolysis of esters of 8-hydroxy-carvotanacetone. It has been found that under these conditions acid is split off with the almost exclusive formation of the 8,9-double bond and that there is little or no tendency for isomerization to take place under these conditions. Since the reaction involves substantially only the 8- and 9-carbon atoms, any optical activity present in the starting ester is preserved in the carvone.

Any suitable carboxylic acid ester can be used, although the acetate is preferred because it is so readily and cheaply prepared. In the preparation of the esters, it is, of course, desirable to avoid strong acid conditions in order to avoid the dehydration and isomerization referred to above. Thus, if one forms the esters using an acid chloride acylating agent, the reaction should be carried out in the presence of some acid binding agent such as pyridine.

The pyrolysis can be carried out over a rather wide range of temperatures. It has been carried out at temperatures ranging from about 135° C. to 400° C. When carried out in the liquid phase, it is most convenient to heat under reflux conditions, but as indicated, vapor phase pyrolysis can be employed. Also, one can carry out the esterification and pyrolysis in a single step. This is most conveniently effected when using anhydrides of higher boiling acids by simply refluxing the mixture of 8-hydroxy-carvotanacetone and acid anhydride. Anhydrides of lower boiling acids can be used, however, and longer times or higher temperatures than obtainable at atmospheric pressure can be employed.

The following examples are illustrative.

Example 1

Forty-five grams of 8-hydroxy-carvotanacetone $\alpha_d^{25}$ —40° (10 cm. tube), and 35 cc. of acetic anhydride were refluxed for one hour. The acetic acid and excess acetic anhydride were then distilled off at about 150 mm. The residue was then refluxed at atmospheric pressure for 8½ hours after which the material was washed with aqueous sodium carbonate and then with water. The reaction mixture had an optical rotation of $\alpha_D^{20}$ —40°, and was shown by infrared and ultraviolet analysis to contain 82% carvone. The mixture also contained some cymene and a small amount of tarry material. The pure carvone can be recovered by distillation.

Example 2

Sobrerol was oxidized by the Beckmann procedure. The oxidation mixture was extracted with ether, washed with brine and the ether removed. The residue was then extracted with methylene chloride and the methylene chloride was removed to leave a residue of optically inactive 8-hydroxy-carvotanacetone. This was then acetylated by refluxing with acetic anhydride and the acetylation mixture washed with water, mineral spirits were then added and the mixture washed with water, after which the solvent was removed under vacuum. The material was then refluxed at atmospheric pressure until the temperature had dropped to 160° C., after which the product was washed with water and steam distilled from sodium carbonate solution. The product was carvone contaminated with cymene.

Example 3

A mixture of 10 grams of 8-hydroxy-carvotanacetone and 13.7 grams of butyric anhydride was refluxed for 4 hours, thus carrying out the esterification and pyrolysis in a single step. The reaction mixture was then agitated with excess 25% sodium carbonate solution for one hour to decompose any remaining anhydride and to wash out the acid. An infrared spectrogram was made on the washed oil. Comparison of the spectrum with the spectra of standard materials showed the oil to be primarily carvone with small amounts of 8-hydroxy-carvotanacetone and the butyrate of 8-hydroxy-carvotanacetone. The oil had the characteristic spearmint odor of carvone.

Example 4

A mixture of 101 grams of 8-hydroxy-carvotanacetone, 75 grams of acetic anhydride and 0.75 gram of sodium acetate was refluxed for one hour, then cooled. Water (400 cc.) was then added and the two phases were mixed vigorously for one-and-a-half hours to decompose the excess anhydride. Methylene chloride was added and the resultant water-insoluble layer was washed with a 25% sodium carbonate solution. Removal of the solvent under vacuum yielded 100 grams of crude acetylated product which contained about 30% of unreacted alcohol as shown by infrared spectrophotometric analysis. The above acetylation was then repeated on the oil using the same quantities of reagents and the anhydride and free acid was removed as before. The infrared spectrogram on the oil (final, 95 grams) still showed about 5–10% unreacted alcohol. The oil was then distilled to yield 8-acetoxy-carvotanacetone with the following properties:

B. P., 110° C., at about 0.7 mm.
$n_D^{25}$ 1.4820
$d_4^{25}$ 1.051

The infrared spectrum of this purified sample of acetylated material had major absorption bands at these wavelengths ($\mu$): 5.8, 5.98, 6.95B, 733B, 7.65, 8.1B, 8.54, 8.85B, 9.05, 9.5, 9.65, 9.89, 10.58, 10.7, 11.05, 11.75, 12.47B, 12.93, 14.1. The figures marked "B" are the center points of broad absorptions.

The ultraviolet spectrum of the pure 8-acetoxy-carvotanacetone had a $\lambda_{max}$ of 229 m$\mu$ in iso-octane and a specific extinction coefficient, $$\alpha = E_{1cm.}^{1\%}, \text{ of } 45.6$$

at this wavelength of maximum absorption.

One fraction of the ester was pyrolyzed in the vapor phase by adding it dropwise down the side of a heated ¼" standard iron pipe, the internal temperature of which was determined from a thermocouple inserted down the center of the pipe. The pyrolysis was conducted at 350° C., at a rate of 2–3 cc./min. The pyrolysate (17–18 cc.) was washed with 25% sodium carbonate solution to yield 15 cc. of final product, which was shown by infrared spectrophotometric analysis to be composed of 50–60% carvone, 20–25% carvacrol and 20–25% unreacted ester. This analysis was accomplished by comparison of appropriate absorption band densities of the spectrum of the final reaction product with those of the spectra of the pure compounds.

The foregoing examples are illustrative and various changes and modifications can be made therein without departing from the invention. Thus, various acid anhydrides, both simple and mixed, can be used.

Having described the invention, what is claimed is:

1. The process which comprises heating an 8-acyloxy-carvotanacetone at a temperature in the range of about 135° C. to 400° C. for a time sufficient to split out the elements of a carboxylic acid said acyloxy group being the acyloxy group of a carboxylic acid.

2. The process of claim 1 in which the 8-acyloxy-carvotanacetone is optically active.

3. The process of claim 1 in which the 8-acyloxy group is an acetoxy group.

4. The process of claim 1 in which the 8-acyloxy group is a bytyroxy group.

5. The process of claim 3 in which the 8-acetoxy-carvotanacetone is optically active.

6. In a process for producing carvone, the step comprising dehydrating 8-hydroxy-carvotanacetone by heating it with carboxylic acid anhydride at a temperature in the range of about 135° C. to 400° C.

7. The process of claim 6 in which the acid anhydride is butyric anhydride.

8. The lower hydrocarbon carboxylic acid esters of 8-hydroxy-carvotanacetone.

9. 8-acetoxy-carvotanacetone.

10. 8-butyroxy-carvotanacetone.

References Cited in the file of this patent

Henderson et al.: J. Chemical Soc. (Brit.) 95, 289–94 (1909).

Beilstein, 4th ed. (1925), Band 8, p. 10.